June 11, 1946.  E. B. BARNES  2,402,010
HEATER
Filed May 25, 1942  2 Sheets-Sheet 2
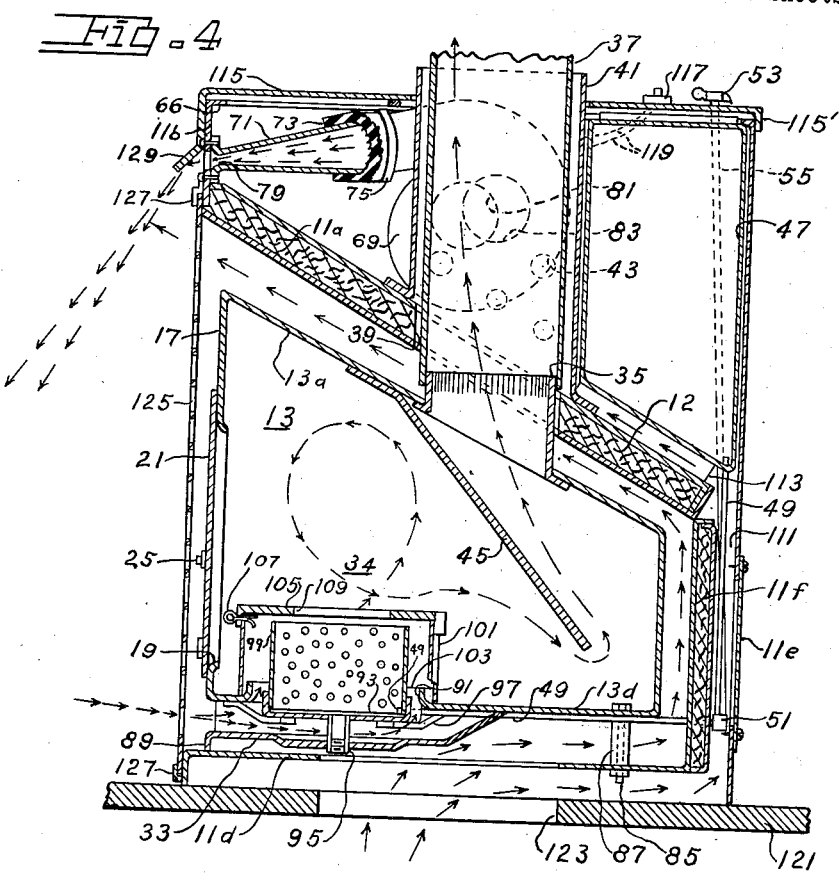
INVENTOR.
Elias B. Barnes
BY  J. J. Hicks
His Attorney Patented June 11, 1946

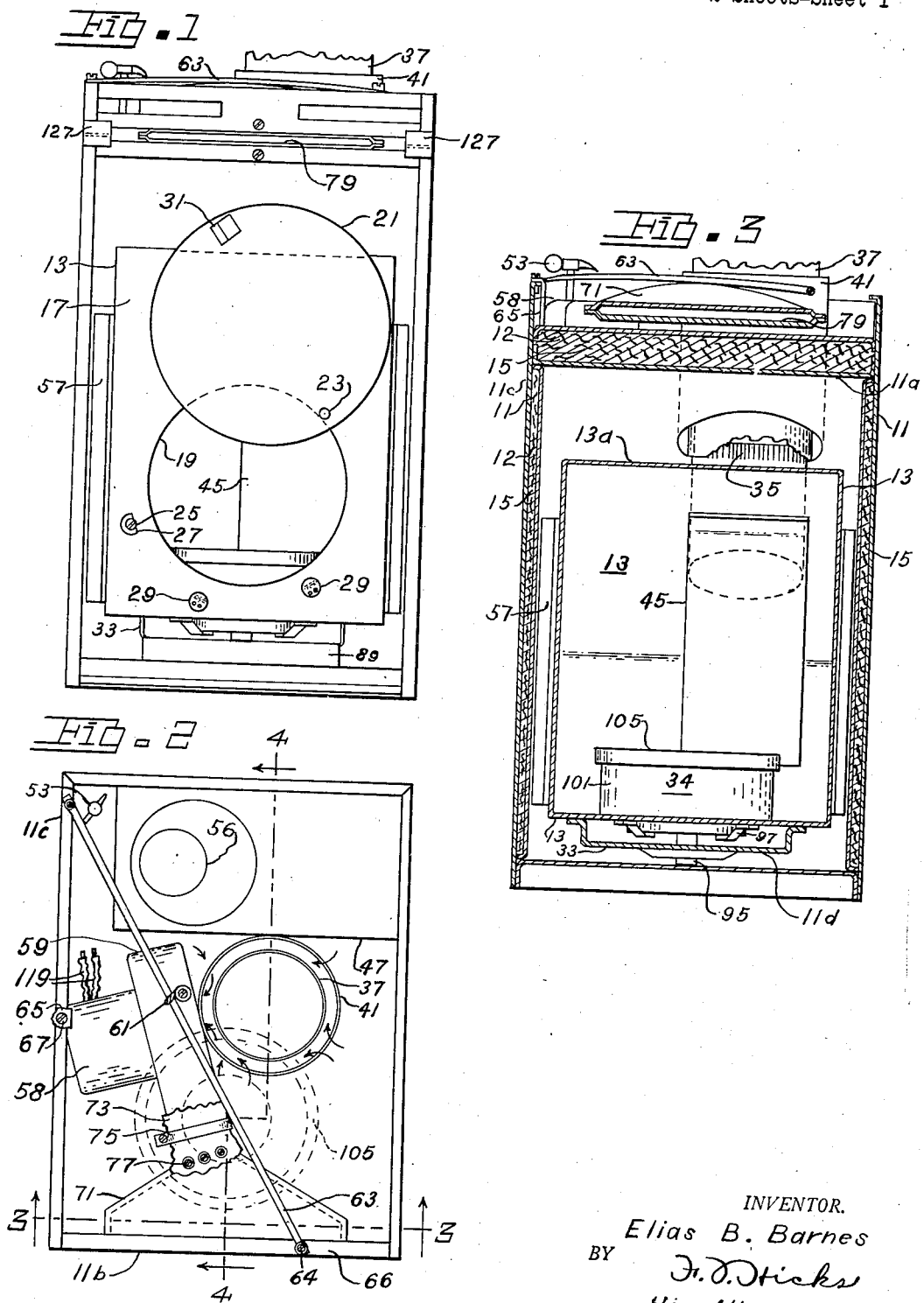

2,402,010

UNITED STATES PATENT OFFICE 2,402,010

HEATER

Elias B. Barnes, Elkhart, Ind.

Application May 25, 1942, Serial No. 444,369

4 Claims. (Cl. 126—110)

My invention pertains to an improved diffusing air heater and changer unit which is especially useful for heating and conditioning the air in small enclosures such as trailers, cabins and the like.

Air-conditioning, according to the Guide of the American Society of Heating and Ventilating Engineers, has for its objective the control of temperature, purity, moisture and movement of air in a room, to produce the desired effects upon the occupants. The engineers society established the following requirements:

1. Air temperature, 63 to 71 degrees Fahrenheit.
2. Air purity, resulting from an intake of 12 cubic feet of outdoor air per person each minute.
3. Air moisture, 30 to 70 per cent relative humidity.
4. Air movement, 15 to 25 linear feet per minute.

It is just as important that we meet these four air requirements in a trailer as it is in any other occupied room. Damp, stagnant, stuffy air is just as deplorable in a trailer as it is in any other dwelling. Trailers are being emphasized for health and pleasure and are useful to workers in the national defense program. But it is impossible to meet these air requirements in trailers by the methods used in ordinary dwellings, because trailers are single rooms, small, narrow, obstructed, exposed, light in construction, entirely so different. The fact that they are so small makes it all the more urgent that we pay particular attention in winter to purity, moisture and the movement of air.

To date, the prevalent trailer circulating heaters have met only one of these four air-conditioning requirements. They heat. They are called "circulating heaters," but they provide no adequate air movement as shown by the fact that trailer floors are cold and ceilings hot.

It is accordingly an object of my invention to provide an improved air diffusing heater unit which, while providing ample heat and air exchange for ventilation and humidity control, will also provide effective air movement and circulation for spreading the heat and providing maximum human comfort.

It is also an object of my invention to provide a simple rugged heater and ventilating unit which is safe, efficient and reliable in operation.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Fig. 1 is a front elevational view of my laterally diffusing air changer and heater with the top cover removed, the grill removed, and the door of the combustion chamber open;

Fig. 2 is a plan thereof;

Fig. 3 is a vertical cross-sectional view taken on line 3—3 in Fig. 2; and

Fig. 4 is a vertical sectional view taken on line 4—4 in Fig. 2.

Referring more specifically to Figs. 1, 2 and 3 of the drawings, it will be seen that my improved laterally diffusing air heater and changer comprises an outer housing 11 enclosing a combustion chamber 13 of a generally similar shape and smaller dimensions so that the walls are spaced and parallel providing adequate air circulating space. The combustion chamber is preferably of a rectangular shape in all horizontal sections to provide ample heat radiating surfaces. The top walls 13a and 11a respectively of the combustion chamber 13 and the enclosing housing 11 slope upwardly from back to front, and the outer housing is open at the front, to facilitate the upward and forward movement of heated air to be projected out from the open front side of the housing, as may be seen in Fig. 4. The side, back and top walls of the outer housing 11 are of a double construction enclosing insulation spaces 12 which are filled with any suitable insulation material 15, such as rock wool, asbestos or the like.

As shown in Fig. 1, the front wall 17 of the combustion chamber is provided with a large aperture 19 providing convenient access to any suitable fuel or oil burner mounted therein. The aperture 19 is preferably circular and is closed by means of a disc 21 of sheet metal pivotally secured on one side by a rivet 23 passing therethrough into the front wall of the combustion chamber. A closure limit and fastener stop is provided comprising a screw 25 with a broad head and a flat-sided washer 27 suitably positioned for limiting the closed position of the closure and also receiving and holding it snugly against the front wall of the combustion chamber. A plurality of such clamping limit stops are preferably provided near the lower edge of the opening and these may be formed of a small metal disc 29 with the side remote from the door aperture secured to the front wall 17, as by spot welding, and the portion adjacent the aperture 19 being bent away from the wall to receive the lower edge of the pivoted closure 21 with a clamping action for securing the closure disc snugly. The free swinging side of the closure disc 21 is provided with a handle 31 which may consist of a strip of sheet metal spot welded thereto at one end and having a grip bent out at the other end.

A sheet metal air inlet conduit 33 is provided in the space under the combustion chamber 13 and opening toward the open front side of the housing for drawing combustion air off of the floor to supply the burner 34 in the combustion chamber, in a manner to be more fully described. As may be seen in Fig. 4, a pipe connection or nipple 35 opens through the lower back portion of the top wall of the combustion chamber for discharging the products of combustion therefrom. The upper end of the pipe nipple 35 is crimped to reduce the diameter and provide for conveniently receiving and snugly fitting the lower end of any suitable stack pipe 37 which may be inserted down thereonto, through a larger opening 39 provided in the upper wall 11a of the insulating outer housing, for discharging the products of combustion externally to the enclosure to be heated. From the larger opening 39 in the upper wall of the housing a short pipe 41 of larger diameter extends upwardly in spaced relation around the stack 37. Several apertures 43 are provided in the sides of the larger pipe 41 to permit air to circulate therethrough. A baffle plate 45 is provided attached to the upper wall 13a of the combustion chamber near the front, as by spot welding, and sloping down toward the back for causing the products of combustion to circulate around and transmit heat to the side walls before passing up the smoke pipe 37.

When oil is the fuel to be burned, an oil tank 47 is mounted on the rear end of the sloping top wall of the enclosing housing from whence an oil line 49 extends down to the oil burner 34 through any suitable valve 51 controlled by a handle 53 through a long rod 55. A screw cap 56 on the top wall of the tank provides convenient access for filling with fuel oil. As the oil tank is substantially above the burner, the rate of fuel flow does not vary substantially as the oil level varies from full tank to empty tank level, and a fairly accurate calibration is obtained by noting the position of the valve for the desired heat capacity under various conditions of weather and climate. Any suitable filter or sump (not shown) is installed in the oil line, preferably between the tank and the valve. Vanes or fins 57 secured firmly in close thermal contact on the side walls of the combustion chamber and projecting laterally and vertically guide the rising air currents and improve heat transfer.

In accordance with my invention, I provide a blower unit comprising an electric motor 58 and a sirocco type blower 59 mounted in the space above the insulated top wall of the outer housing. For silent operation, the blower 59 is suspended by flexible cord or wire 61 around a diagonally disposed rod 63 having one end secured by a screw 64 on the top flanged edge 66 of the front wall 11b and the other end secured by a screw on the top edge of a side wall 11c. The motor end of the blower unit may be also supported, as by a flexible or resilient member, a strip of rubber or a spring 65, extending from the end of the motor frame over and secured to the inturned edge flange of the adjacent side wall 11c, as by a screw 67.

Connecting from the outlet port of the scroll casing 69 of the blower, I provide an air conducting conduit or discharge nozzle 71 which diverges horizontally across the front side of the housing. To flexibly connect the blower to the discharge nozzle, a flexible sheet material 73, such as rubber, leather, canvas or the like, is wrapped around the adjacently disposed ends thereof and secured to the blower by a clamping band 75 and attached to the discharge nozzle as by rivets or screws 77.

While the discharge nozzle 71 diverges widely toward the front of the unit and forms a horizontally elongated air discharge slot 79, as may be seen in Fig. 1, it converges vertically, as may be seen in Fig. 4. The shape and position of the blower discharge nozzle 71 is such that it discharges a thin sheet of air directed forwardly and downwardly over the open front of the housing from whence the hot air is delivered. The intake port 81 of the blower casing 69 draws in warm air from the space above the housing and around the smoke stack 37. The large pipe 41 around the stack operates as a collector of residual heat and is preferably provided with a large hole 83 adjacent the intake port of the blower for drawing a substantial portion of intake air from around the smoke pipe 37 and thus utilizing a portion of the residual heat in the combustion gases which would otherwise be discharged outside and wasted.

As shown in Fig. 4, the bottom wall 13d of the combustion chamber 13 may be firmly secured to the bottom wall of the housing 11d in spaced relation thereabove, as by screws 85 passing through tubular spacers 87 of which there may be any desired number. The front end of the floor air inlet conduit 33 has a downturned lip 89 which engages the bottom wall 11d of the housing near the front edge. The sides and rear of the air conduit 33 close firmly against the bottom side of the bottom wall 13d of the combustion chamber to which attachment is made in any suitable manner, as by spot welding. The floor air inlet conduit 33 extends from the open front of the housing back under the combustion chamber 13 a suitable distance for conducting air off of the floor of the room into an aperture 91 in the bottom wall of the combustion chamber through which it passes upwardly around the burner to support combustion in the combustion chamber. Any suitable burner may be utilized. As shown in Figs. 1, 3 and 4 the burner may be a pot type oil burner having a bowl shaped oil receptacle 93 with the lower end of the oil line 49 passing into the rear side thereof and having an overflow pipe 95 connecting through the bottom of both the receptacle and the air conduit 33 for disposal of any overflow, if on rare occasions some unburned oil might escape. Bracket arms 97 of strap iron are secured, as by welding, between the bottom of the oil bowl 93 and the bottom side of the bottom wall 13d of the combustion chamber, for mounting the bowl in a concentric position in the air inlet aperture 91 so that air drawn off of the floor of the heated enclosure may rise freely on all sides. A perforated cylindrical sheet metal flame baffle 99, open at both ends, is fitted snugly down into the oil bowl. The burner is a cylindrical sheet metal enclosure 101 open at the bottom end and fitting down on the floor 13d of the chamber around the outside of a marginal flange 103 turned up around the inlet aperture 91. The upper end of the enclosure member 101 is partially closed by a cast ring 105 secured thereto, as by cotter pins 107, and having a central aperture 109 through which the flame passes from the burner.

The side walls of the outer enclosing housing 11 extend back and support a second or outside back wall 11e spaced back of the insulated back wall 11f and providing an air space 111 through which a small portion of the fresh outside air rises, passing forward over the sloping top wall 11a and under the fuel tank 47 which is mounted spaced thereabove on support strips 113.

As shown in Fig. 4, a top cover 115 having downturned edges 115' is fitted down over the upper edges of the enclosing housing 11. The cover is provided with an aperture through which the upper end of the valve control rod 55 projects to conveniently position the valve control handle 53. The cover 115 carries an electric switch 117 for controlling the electric motor 58 from whence the wires 119 may extend through a convenient plug in cord (not shown) in a well known manner. The cover and also the outer back and side walls are made of a suitable gauge of sheet metal to provide the desired strength and rigidity. For a pleasing appearance, the outer surfaces may be provided with any finish desired. For this purpose a bronze-baked wrinkle enamel finish has been found to be very pleasing and satisfactory. The combustion chamber and its closure member are preferably made of heavy blued stove metal.

In operation, my heater and changer unit is mounted, as shown in Fig. 4, upon the floor 121 of the trailer, cabin or other small enclosure wherein it is desired to provide air heating and exchanging for temperature and humidity control and also to circulate the air for even distribution of the heat to provide air flow for human comfort. A hole 123 is provided in the floor under the unit to provide fresh outside air for heating and ventilation. The burner 34 having been ignited, and the closure 21 being closed, a front grill 125 is slipped edgewise into support guides 127. The blower is started and the oil control valve handle 53 is set at a proper position for the heat requirements to be satisfied.

The heat of combustion causes the hot combustion gases to rise up the stack 37 in a well known manner, as indicated by the dotted line and arrows. Because of the baffle 45 between the burner 34 and the exhaust pipe outlet nipple 35, the hot combustion gases are caused to swirl and eddy around in the combustion chamber 13 to carry a larger portion of the heat to the walls of the combustion chamber. As the combustion gases rise up the exhaust stack 37, air is drawn off of the floor 121 through the air inlet conduit 33 rising into the combustion chamber 13 around the burner, relieving the room of the cold foul air near the floor and utilizing it in the most effective manner for combustion. Fresh outside air entering through the hole 123 in the floor passes around the outside of the combustion chamber 13 and rises therearound, as shown by the arrows. The heated fresh air then enters the space provided between the sloping top walls 13a and 11a of the combustion chamber and the insulated enclosing housing. These top walls slope upwardly from back to front so that the movement of the air is expedited as it rises therebetween, and it is projected laterally with substantial velocity out of the open front of the housing into the room.

The blower 59, suspended in the insulated tank compartment or space above the housing, draws in warm air from this space and from around the stack and projects the air as a thin sheet through the elongated slot 79 in the nozzle 71 at the front of the unit above the housing opening from whence the hot air is delivered. By the position of the nozzle and by the cooperative action of a deflecting baffle or vane 129 projecting down and out on the front edge of the cover 115 just above the nozzle, the blower projected sheet of air is directed forwardly and downwardly, as indicated by the arrows, to so direct the heated air which comes from around the combustion chamber. This spreads all of the incoming heated air wide and strong along the floor, to warm the floor and the entire coach with a delightful air movement for maximum comfort. Because the blower intake air is drawn from the space above the housing and around the stack, the thermal efficiency of my laterally diffusing air heater and changer is also substantially increased by this improved arrangement.

It is apparent that within the scope of the invention, modifications and different arrangements may be made other than herein disclosed, and the present disclosure is illustrative merely, the invention comprehending variations thereof within the scope of the appended claims.

I claim:

1. A laterally diffusing air changer and heater comprising, wall means forming a combustion chamber, a fuel burner mounted in said chamber, the bottom wall of the combustion chamber having an aperture therein for receiving combustion air, a stack connecting upwardly from said chamber, wall means forming an insulating housing enclosing the combustion chamber in spaced relation and opening to the front side, the bottom wall of said housing having an aperture therein for admitting fresh air to rise in the space around the combustion chamber for receiving heat and discharging heated air laterally from the open side of the housing, a residual heat collector around said stack, a blower mounted for drawing warmed air from the heat collector above said housing, said collector being open to receive air at the top and the side having an aperture communicating with the blower intake, a cover fitting on said housing and around said stack and collector for enclosing the space above the housing, air conduit means connecting from the discharge side of said blower, the discharge end of said air conduit means being of a slot-like shape elongated horizontally and positioned above the open side of said housing for projecting a sheet of air, and deflector means above the discharge end of said air conduit and extending in an outward and downward direction for deflecting the sheet of air to thereby deflect the heated air from around the combustion chamber laterally and downwardly.

2. An air heating ventilating and diffusing unit for small enclosures comprising, wall means forming an insulating housing of substantially rectangular horizontal cross sections open at the front side, wall means forming a combustion chamber of smaller size than the housing and of a substantially similar conformation, means for mounting said combustion chamber in said insulating housing with the walls in substantially parallel spaced relation, the bottom wall of the combustion chamber having a floor air admitting aperture, a floor air conduit connecting from said floor air aperture and extending through the space under the combustion chamber and opening adjacent the bottom of the unit toward the front side of the insulating housing for drawing air off of the floor of an enclosure to be heated by the unit, a fuel burner mounted in said combustion chamber, a stack connection opening from the combustion chamber through the top wall of said housing for discharging combustion products and drawing floor air into said chamber, a movable closure on said chamber to provide access to said burner, a ventilating aperture opening through the bottom of the enclosing housing under said combustion chamber to admit fresh outside air received through a suitably apertured floor for rising around the hot combustion chamber in segregated relation from the foul floor air and discharging from the open side of the housing, means for defining an air space above the housing, a blower mounted with its intake in the space above the housing for drawing warmed air from the space above said housing, air conduit means connecting from the discharge side of said blower, said conduit means terminating in a nozzle of a slot-like shape elongated horizontally and positioned above the open front of said housing for projecting a sheet of air and means positioned above said nozzle and extending in an outward and downward direction for so directing the sheet of air as to deflect the heated air from around the combustion chamber laterally and downwardly, while the draft of combustion air from a room into said floor air conduit further aids in keeping the heated air down near the floor of the room to be heated.

3. In a laterally diffusing air changer and heater, wall means forming a combustion chamber of a rectangular shape in all horizontal cross-sections, said combustion chamber having its top wall sloping upwardly from back to front, wall means forming an insulating housing of a similar shape but having larger dimensions than the chamber and disposed in enclosing spaced relation around said chamber, said housing being open at the front and the bottom wall of said housing having a ventilating aperture for admitting fresh air to rise in the space around said chamber for receiving heat and projecting from the open front side of the housing, a fuel burner mounted in said combustion chamber, the bottom wall of said combustion chamber having an air inlet aperture, a floor air inlet conduit connecting from said air inlet aperture through the space under the combustion chamber and opening adjacent the bottom of the unit toward the front of the housing for drawing air off of the floor of an enclosure to be heated, a stack connection opening from the top wall of the combustion chamber for discharging combustion products therefrom, means defining an air space above said housing, a blower mounted with its intake communicating with said air space above the housing for drawing warmed air from the space above said housing, air conduit means connecting from the discharge side of said blower, a nozzle connected to said air conduit means, said nozzle being suitably shaped and positioned above the open side of said housing for projecting a sheet of air, and deflector means positioned above said nozzle and extending outwardly and downwardly for so directing the sheet of air as to deflect the heated air from around the combustion chamber laterally and downwardly.

4. An air heating and ventilating unit for small enclosures comprising, wall means forming a combustion chamber, the front wall of said chamber having an opening, a closure member movably disposed over the opening in the combustion chamber, wall means forming an insulating housing enclosing said combustion chamber in spaced relation and being open on the front side, means mounting the combustion chamber in spaced relation above the bottom wall of the enclosing housing, a stack connection opening from the combustion chamber through the top wall of the housing, the bottom wall of the combustion chamber having an air admitting aperture, a fuel burner mounted in said combustion chamber for exposure in the air stream flowing through the air admitting aperture, a floor air conduit connecting from said air admitting aperture in the bottom of the combustion chamber and opening adjacent the bottom of the unit and to the front of said housing to draw air off of the floor of an enclosure to be heated by the unit, a ventilating aperture opening through the bottom of the enclosing housing to admit fresh outside air through a suitably apertured floor for rising around the hot combustion chamber in segregated relation from the floor air and discharging from the open side of the enclosing housing while floor air is drawn through the combustion chamber, means defining an air space above said combustion chamber, a residual heat collector around said stack, said collector having a side aperture in said space and a top opening above the unit, a blower mounted in said space having its intake communicating with the side aperture of said collector for drawing warmed air from the heat collector, a nozzle of a slot-like shape elongated horizontally and positioned above the open side of said housing, conduit means connecting the blower to the nozzle for projecting a sheet of air, and means above the nozzle and extending outwardly and downwardly for directing the projected air sheet so as to deflect the heated air laterally and downwardly.

ELIAS B. BARNES.